US008756597B2

(12) United States Patent
Srinivasan et al.

(10) Patent No.: US 8,756,597 B2
(45) Date of Patent: Jun. 17, 2014

(54) EXTENDING FUNCTIONALITY OF LEGACY SERVICES IN COMPUTING SYSTEM ENVIRONMENT

(75) Inventors: Kaltiganehalli Y. Srinivasan, Princeton Junction, NJ (US); Stephen R. Carter, Spanish Fork, UT (US); Carolyn B. McClain, Springville, UT (US); Jonathan P. Bultmeyer, Dorchester, MA (US)

(73) Assignee: Novell, Inc., Provo, UT (US)

( * ) Notice: Subject to any disclaimer, the term of this patent is extended or adjusted under 35 U.S.C. 154(b) by 801 days.

(21) Appl. No.: 12/700,989

(22) Filed: Feb. 5, 2010

(65) Prior Publication Data
US 2011/0197188 A1    Aug. 11, 2011

(51) Int. Cl.
G06F 9/46     (2006.01)
G06F 9/455    (2006.01)
G06F 15/173   (2006.01)
G06F 7/04     (2006.01)

(52) U.S. Cl.
USPC ............... 718/1; 718/104; 709/224; 709/225; 709/226; 726/1; 726/2

(58) Field of Classification Search
USPC .............. 718/1–105; 719/313, 318–321, 328; 709/223–226
See application file for complete search history.

(56) References Cited

U.S. PATENT DOCUMENTS

| | | | | |
|---|---|---|---|---|
| 8,028,048 | B2* | 9/2011 | Karve et al. ................... | 709/221 |
| 8,156,253 | B2* | 4/2012 | Watanabe .......................... | 710/8 |
| 8,595,480 | B2* | 11/2013 | Dimitrakos et al. .......... | 713/153 |
| 2006/0200821 | A1 | 9/2006 | Cherkasova et al. | |
| 2007/0266383 | A1* | 11/2007 | White ................................ | 718/1 |
| 2007/0288535 | A1* | 12/2007 | Shitomi et al. ................ | 707/204 |
| 2009/0112972 | A1* | 4/2009 | Liu ................................. | 709/203 |
| 2010/0306359 | A1* | 12/2010 | DeHaan et al. ............... | 709/223 |
| 2010/0306377 | A1* | 12/2010 | DeHaan et al. ............... | 709/226 |
| 2011/0072486 | A1* | 3/2011 | Hadar et al. ....................... | 726/1 |
| 2011/0113467 | A1* | 5/2011 | Agarwal et al. ................... | 726/1 |
| 2011/0131589 | A1* | 6/2011 | Beaty et al. .................... | 719/318 |
| 2011/0138441 | A1* | 6/2011 | Neystadt et al. ................... | 726/1 |
| 2012/0226825 | A1* | 9/2012 | Smith et al. ................... | 709/250 |

FOREIGN PATENT DOCUMENTS

GB    2423168 B    7/2009

OTHER PUBLICATIONS

European Search Report for European Application No. 11153086.1 dated Jun. 22, 2011.
susestudio.com/ SUSE Studio Introduction printed Jan. 12, 2010 2 Pages.

(Continued)

*Primary Examiner* — Abdullah Al Kawsar
(74) *Attorney, Agent, or Firm* — King & Schickli, PLLC (57) ABSTRACT

Methods and apparatus involve extending functionality of legacy services. A legacy application has functionality designed for use on an original computing device. In a modern environment, virtual machines (VMs) operate as independent guests on processors and memory by way of scheduling control from a virtualization layer (e.g., hypervisor). At least one VM is provisioned to modify standard entry points of the original legacy application for new accessing of various system functions of the hardware platform. Representative functions include network access, processors, and storage. Policy decision points variously located are further employed to ensure compliance with computing policies. Multiple platforms and computing clouds are contemplated as are VMs in support roles and dedicated software appliances. In this manner, continued use of legacy services in modern situations allows participation in more capable environments and application capabilities heretofore unimagined. Other embodiments contemplate computing systems and computer program products, to name a few.

34 Claims, 6 Drawing Sheets

(56) References Cited

OTHER PUBLICATIONS en.wikipedia.org/wiki/Configuration_management_database Configuration management database Printed Jan. 5, 2010 2 Pages.
PlateSpin PlateSpin Products © PlateSpin Ltd. 2 Pages, 2007.
novell.com/documentation/platespin_portabilitysuite_810/pdfdoc/config/config.pdf Configuration Guide Novel® PlateSpin® Portability Suite 8.1 Jul. 23, 2009 28 Pgs.
novell.com/documentation/platespin_portabilitysuite_810/pdfdoc/user/user.pdf User Guide Novell® PlateSpin® Portability Suite 8.1 Oct. 28, 2009 128 Pages.

* cited by examiner

EXTENDING FUNCTIONALITY OF LEGACY SERVICES IN COMPUTING SYSTEM ENVIRONMENT

FIELD OF THE INVENTION

Generally, the present invention relates to computing devices and environments involving legacy services (e.g., computing services originally configured without contemplation of modern situations, such as virtual machines, cloud computing, software appliances, etc.). Particularly, although not exclusively, it relates to the continued use of these services, but with modern functionality allowing participation in more capable environments and adding capabilities heretofore unimagined. Other embodiments involve computing systems and computer program products, to name a few.

BACKGROUND OF THE INVENTION

In modern computing environments, it is typical for enterprises or persons to utilize virtual machines, multi-core processors, software appliances, private and public "clouds," etc. Unfortunately, many existing applications were configured at a time before the advent of these new advances. While mainstream applications have continual releases attempting to keep pace with computing changes, many others have no feasible mechanism for upgrading. To stay in existence, they often rely on complete rewrites of original code. Still others are patched with partial rewrites in order to bridge semantics between original code and devices proprietary to third parties. On the other hand, it is highly desirable to maintain some of these original, legacy applications because of the breadth and value of services provided.

Accordingly, a need exists in the art for continued use of legacy services, especially with as little modification to original code as necessary. Appreciating these services may find value in earlier-unimagined computing situations, the need further contemplates adding to a service's original capabilities by bridging to modern paradigms. Providing growth to still a next generation of computing situations is but a further need. Any improvements along such lines should also contemplate good engineering practices, such as simplicity, ease or implementation, security, unobtrusiveness, stability, etc.

SUMMARY OF THE INVENTION

By applying the principles and teachings associated with extending legacy service functionality in a computing system environment, the foregoing and other problems become solved. Broadly, methods and apparatus utilize legacy services in modern and more capable environments and create situations for capabilities beyond those originally contemplated when the services were first configured.

In a representative embodiment, a legacy application has executable instructions configured for use on an original computing device. On a hardware platform, virtual machines (VMs) operate as independent guests on processors and memory by way of scheduling control from a virtualization layer (e.g., hypervisor). At least one VM is provisioned with functions to modify standard entry points of the original legacy application for access options to various system functions of the hardware platform. Of these, network access, processors, and storage are contemplated including network bandwidth options, processor functions, and storage size and locations.

Policy decision points of executable instructions are variously located with VMs and/or the virtualization layer. They are employed to ensure compliance with computing policies, especially those associated with the access options of the system functions. They also monitor the functions and resultant actions for compliance.

Multiple platforms of VMs are also contemplated as is their communication. High-speed communication fabric bandwidth are employed in certain situations. In others, policy decision points are located advantageously. In any configuration, the options available to the legacy services are expanded amongst the many platforms.

Traditional data centers for enterprises and cloud computing situations are involved with features of the invention, and the clouds may represent private and/or public clouds. Further features contemplate instantiation and migration of the legacy services in and out of clouds and in front or behind firewalls. Other options made available to the services may also be variously located in the cloud or elsewhere and may require bridging semantics between the service and option. In any, the functionality provided to the legacy services is treated as transparently as possible from the vantage point of the service. Dedicated appliances are also contemplated.

To assist the foregoing, infrastructure support is made available in the form of other or common VMs. Such services include, but are not limited to, event logging, event audit, a quality-of-service metrics, load-balancing service as different virtual environments are encountered, sequencing services to launch VMs in an appropriate order along with boot services, or firewall services, to name a few.

In still other embodiments, executable instructions loaded on one or more computing devices are contemplated for undertaking the foregoing as are computer program products available as a download or on a computer readable medium. The computer program products include executable instructions for provisioning a virtual machine to operate as an independent guest computing device on a processor and memory of a hardware platform by way of scheduling control from a virtualization layer and provide benefit to a legacy application on a same or different hardware platform for system functions of at least network access, processor functions or storage options originally unavailable to the legacy services.

Certain advantages realized by embodiments of the invention include, but are not limited to, providing enhanced functionality to legacy applications, configuring dated applications for use in modern computing situations, and configuring with a variety of platforms, a variety of infrastructure services and enabling migration.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for extending functionality of legacy services in a virtual computing environment.

Figure 1:
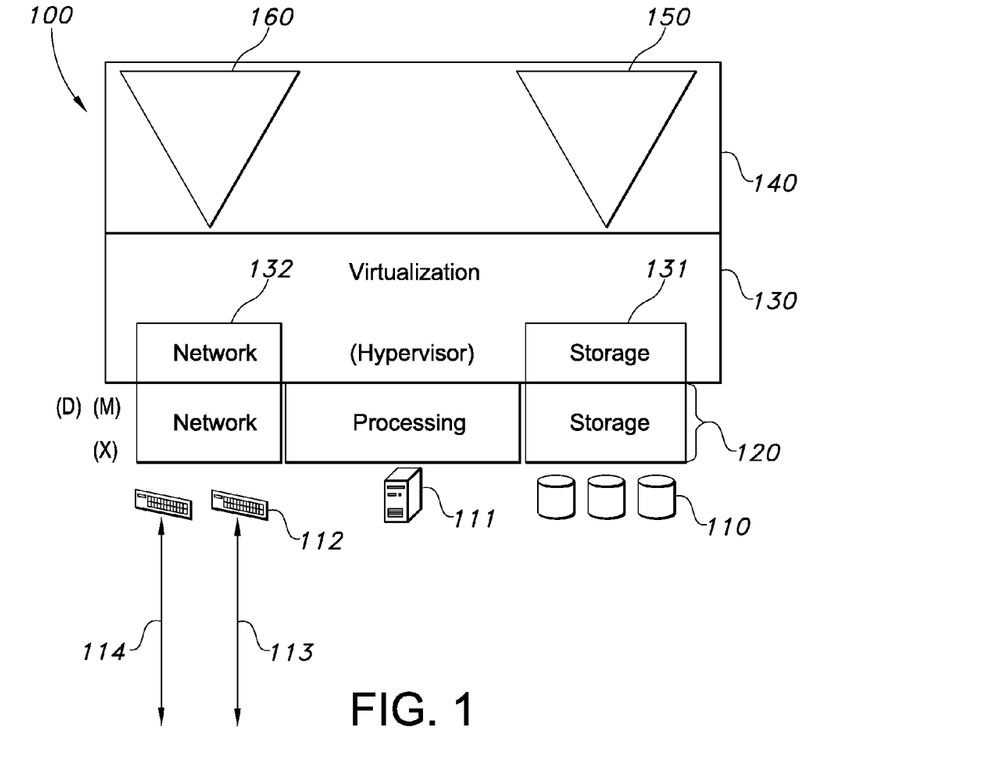
FIG. 1 is a diagrammatic view in accordance with the present invention of a basic computing device hosting virtual machines.

With reference to FIG. 1, a computing system environment includes a computing device 100. Representatively, the device is a general or special purpose computer, a phone, a PDA, a server, a laptop, etc., having a hardware platform 120. The hardware platform includes physical I/O and platform devices, memory (M), processing 111, such as a physical CPU(s) (multi-core single core, multiprocessor, single processor, etc.), disk or other storage 120 USB or other interfaces (X), drivers (D), etc. In turn, the hardware platform hosts one or more virtual machines (VMs) (inverted triangle symbols 150, 160) in the guest environment at 140. As is typical, these VMs may form a variety of domains (domain 0, or management domain, domain U, etc.). Each potentially has its own guest operating system (O.S.) (e.g., Linux, Windows, Netware, Unix, etc.), applications, and file systems, etc. "Just enough operating systems" (JEOS) are still other embodiments.

At 130, an intervening virtualization layer (e.g., Xen, HyperV, KVM, VmWare or other hypervisor), also known as a "virtual machine monitor," or virtualization manager, serves as a virtual interface to the hardware platform and virtualizes the hardware. It contains instructions that allows transparent access to storage at 131 and network at 132, for example. It is also the lowest and most privileged layer and performs scheduling control between the virtual machines as they task the resources of the hardware platform, e.g., memory, processor, storage, network (by way of network interface cards, for example), etc. The hypervisor also manages conflicts, among other things, caused by operating system access to privileged machine instructions. The hypervisor can also be type 1 (native) or type 2 (hosted). According to various partitions, the operating systems, applications, application data, boot data, or other data, executable instructions, etc., of the machines are virtually stored on the resources of the hardware platform. Appreciating the modernness of this arrangement, many original developers of computing applications did not anticipate their functionality or services being used in such a situation.

In use, the representative computing device 100 is arranged to communicate with one or more other computing devices or networks. In this regard, line speeds and bandwidth from each network access point may be different per each platform, such as 113 being 100 Mb and 114 being 1 Gb. The communications may also consist of wired, wireless or combined connections to other devices/networks and may be direct or indirect connections. If direct, they typify connections within physical or network proximity (e.g., intranet). If indirect, they typify connections such as those found with the internet, satellites, radio transmissions, or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

Figure 2:
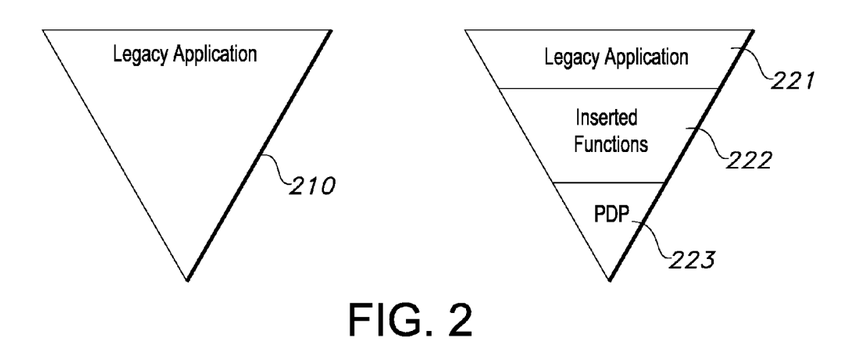
FIGS. 2-6 are diagrammatic views in accordance with the present invention of various embodiments for extending functionality of legacy services.

With reference to FIG. 2, a legacy application includes those computing applications configured in the past without having modern computing functionality. For instance, a payroll application for an enterprise may have been a program installed on a dedicated server for an accounting department's use, but now needs upgrading for migration to a cloud. In other designs, the application may be a legacy service configured for word processing, spreadsheet, drawing, or any conceivable type of computing functionality utilized by individuals to large enterprises. Regardless of form, the original code of the application is first converted into a virtual machine 210 for use on a computing device (100, FIG. 1). This occurs with products such as Novell, Inc's, PlateSpin product or other mechanisms.

In a second step, or one concurrent with the virtualization of the service, the legacy application is configured with virtual machine functions entitled "Inserted Functions" 222 and policy decision point (PDP) 223. The former is configured such that standard entry points used by the legacy application 221 for access to system functions of the hardware platform, such as processor functions, storage access and network access, are modified to access the Inserted Functions without any further modification to Legacy Application 221. The latter (PDP) is configured such that the Inserted Functions 222 are monitored by and actions modified by the PDP 223 so that policy encapsulated within the PDP 223 via mechanisms within the invention are enforced. The PDP may be alternatively configured to access and receive policies from other locations. (As will be seen in various embodiments, the Inserted Functions and PDP may be variously packaged as additional virtual machines, within other locations, with counterparts, or the like.)

In any embodiment, representative examples of the interplay between the Inserted Functions and the PDP, their locations, etc., are given as follows:

Storage Example:

Assume S is a service which manipulates sensitive data and as originally deployed is typically bound to non-shared disks or on an isolated network. Rather than perpetuating the isolation requirements, a set of policies and related Inserted Functions are included with S such that the deployment environment for S can be considered during operation. For example, the deployment environment would include characterizations for storage as being isolated (physically and accessibility wise) or shared. As S writes to disk, the PDP checks the environment characteristics, and in the shared storage case, the data is encrypted as it is written. The Inserted Functions would include, environment detection, data encryption, key management and the necessary policies to run the PDP.

Service Access Example:

Assume S is a service which currently maintains connections to another service X (such as database or LDAP server) hosted within an enterprise data center. As S is deployed outside the data center, beyond the data center firewall, the dependance on X is satisfied via the PDP's detection of locality of S and diversion or proxying of the necessary protocols to allow S to communicate with X unaware of the new deployment model. The Inserted Functions would include the protocol diversion/proxying mechanisms. This further contemplates Inserted Functions providing security to the service S as if it remained behind the firewall along with X, but is otherwise receiving security functions remotely unbeknownst to S.

Clustering Example:

Assume service S supports clustering, but requires the set of cluster members to be known at service configuration. As S is deployed (as S1, S2, . . . ), Inserted Functions detect cluster communication and call the PDP to determine how the communication should be handled. Also deployed with S is a service which manages dynamic clusters (where cluster membership may grow and shrink based on some metric such as load or time of day/week, etc.). Here the PDP, cluster manager and inserted clustering functions work in cooperation to allow S to continue to support clustering unaware of the new deployment model. Note, this could also include operations described above in the Service Access example where the cluster members previously had to exist on a single subnet and via the proxying mechanism described there now may exist on any subnet—here data may also, by policy, be encrypted as it crosses subnets, but not as it is communicated within the single subnet.

Figure 3:
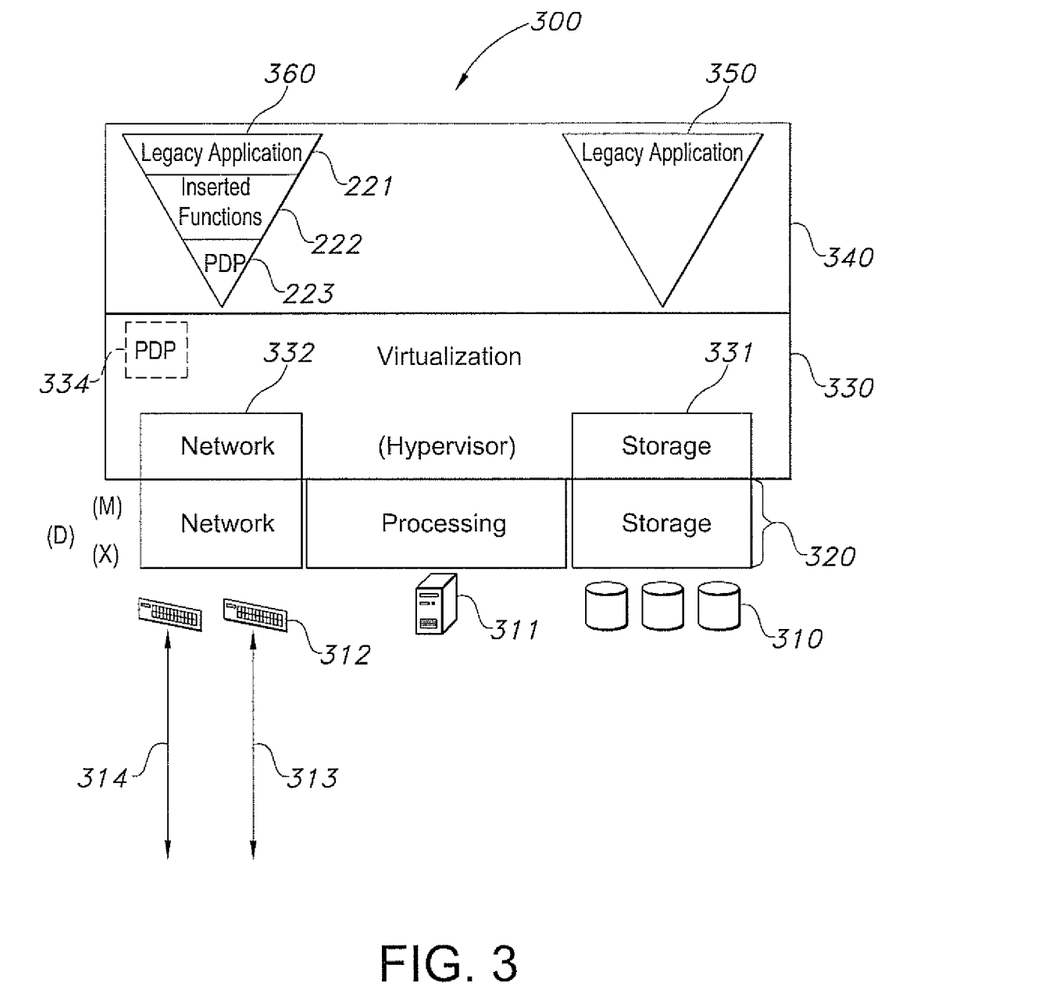

With reference to FIG. 3, the modifications to the legacy application within the virtual machine, because of inserted functions and a PDP, results in a computing device configured as 300. At 350, the legacy application as a virtual machine continues to function as it always has. On the other hand, the modified virtual machine at 360 (which includes Inserted Functions and PDP) has access to other storage, network, and processing options, etc., of the hardware platform heretofore unimagined when the legacy service was originally configured. For example, a selection governed by the PDP relative to a predetermined computing policy can be made to achieve for the legacy application 221 higher or lower bandwidth network connections, such as at 314 or 313, higher bandwidth or storage mechanisms (or remote or local storage) at 310 and/or more capable processing mechanisms (e.g., processor speed, multiplicity of processors, etc.) at 311. In other examples, policy may dictate a hierarchy of priority of the processing of workloads by the virtual machines configured in guest space 340. If high priority, the workloads may need fast processing, multiple processors, local storage, high bandwidth network connections, copious amounts of memory, etc. On the other hand, low priority may dictate limited processor functionality, remote storage, little memory, or the like. The PDP then governs the role of the Inserted Functions as the various virtual machines access the system resources of the hardware platform at 320.

In another example of functionality provided by Inserted Functions, skilled artisans should consider those actions required by an ITIL (Information Technology Infrastructure Library) installation wherein a CMDB (Configuration Management Database) is used to control configuration and operation characteristics. In normal practice, a legacy application has no means in which to participate in such a situation and requires altering. Whereas, this embodiment provides for a mechanism in the form of executable instructions of Inserted Functions whereby the application need not be changed but may still fully participate. That is, the Inserted Functions bridge the semantics between the legacy application and the new installation. This allows the new policy and configuration to be enforced which was not contemplated when the service was first developed. This emphasizes the fact that the CMDB is now enforcing policy and configuration which was not contemplated by the original service.

In such an embodiment, VMs 360, 350 and other virtual machines are packaged as a VM bundle where the hypervisor, 330, maintains CMDB relationships and a PDP for managing the cooperating VMs as a single computing unit. Here, there may be inserted functions within the VM at 360, but by moving the inserted PDP 334 to the hypervisor (or adding a cascaded PDP there), the system can realize a greater level of interoperability and QOS guarantees without modifications to the original Legacy Application. Of course, skilled artisans can contemplate other scenarios.

Figure 4:
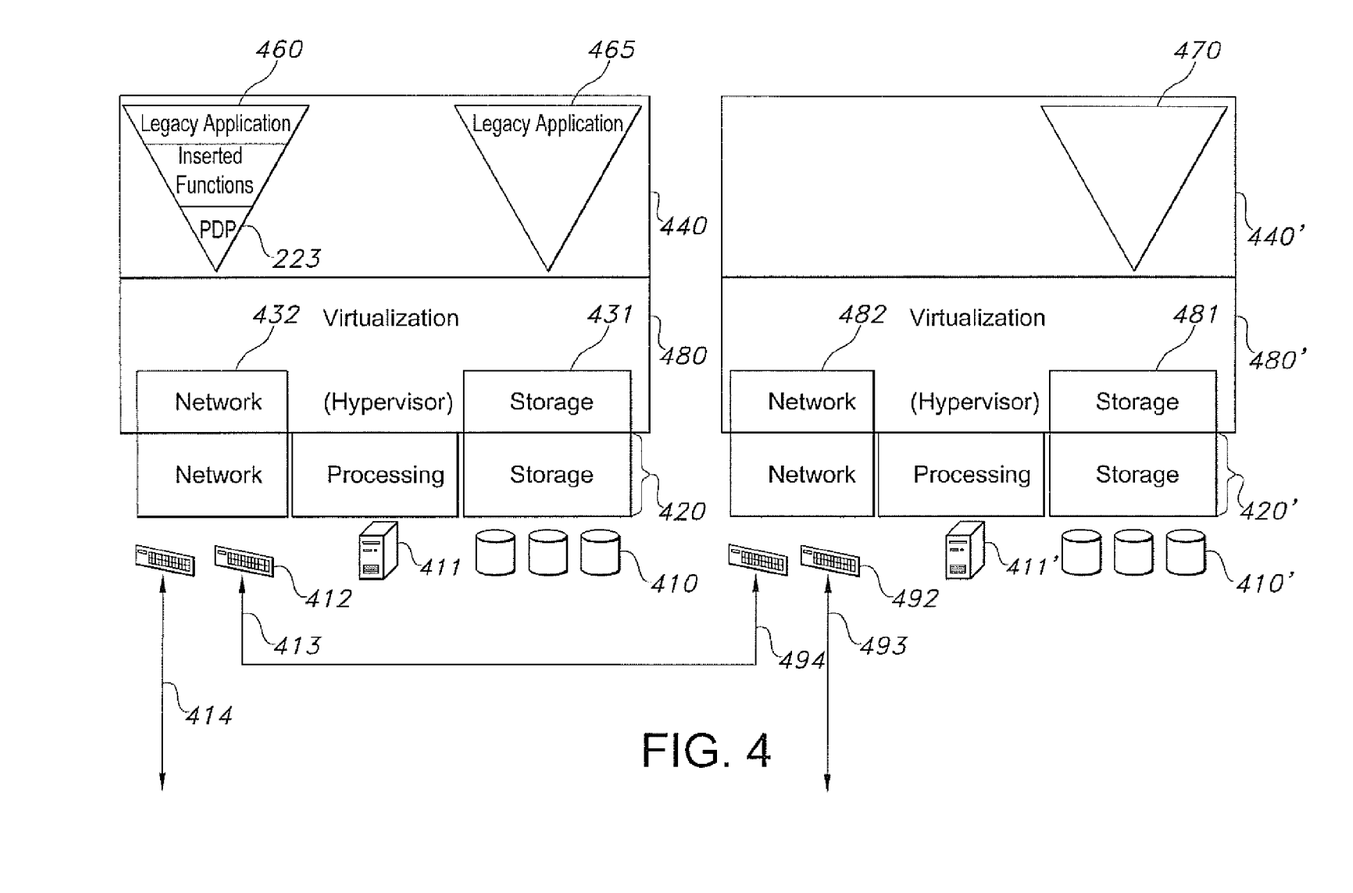

In another embodiment with reference to FIG. 4, VM 460 communicates with one 465 or more 470 additional virtualized applications on a same or different hardware platform 420, 420'. (Note: some of the applications may also be non-virtualized in a traditional hardware platform absent a virtualization mechanism). In such a configuration, all network and or storage requests are conveyed over an internal communication fabric, such as shown at 413 and 494 (which could be a very high-speed fabric such as 10 Gb or 100 Gb bandwidth fabric) so that the PDP and privileged resource access is handled through VM 470. In this manner, VM 460 can operate on less privileged hardware and still retain access to privileged resource access mechanisms on other hardware platforms 420'. Of course, the privileged access is handled through 482 and 481 in cooperation with 470 which, because of some configuration or API calls, has been made privy to the privileged resource access mechanisms so they can act on behalf of other processes such as 460.

Further, the policy provided to the PDP 223 at VM 460 can be communicated to 470 so that all of the decision-making of the policy decision point is performed at 470. Similarly, cooperating or independent PDP's can reside with either or both of the virtualization layers 480, 480', as in earlier embodiments. In still another embodiment, a predetermined computing policy can include policy restrictions such that, for example, restrict access to an SQL database at 410' by inserting an appropriate "WHERE" clause. In this manner, a manager may see summary information only for those enterprise employees who are direct reports. This functionality may also provide for storage locality 410, 410' and VM instantiation locality 440, 440'. This, coupled with CSS (Cloud Security Services) technology, bundled as a cooperating VM, provides secure and transparent cloud bridging between clouds or from clouds to the traditional data center.

As readily imagined, many other appropriate restrictions can be applied externally to the legacy application which will provide appropriate restriction to information which the legacy application was not programmed to provide originally.

Figure 5:
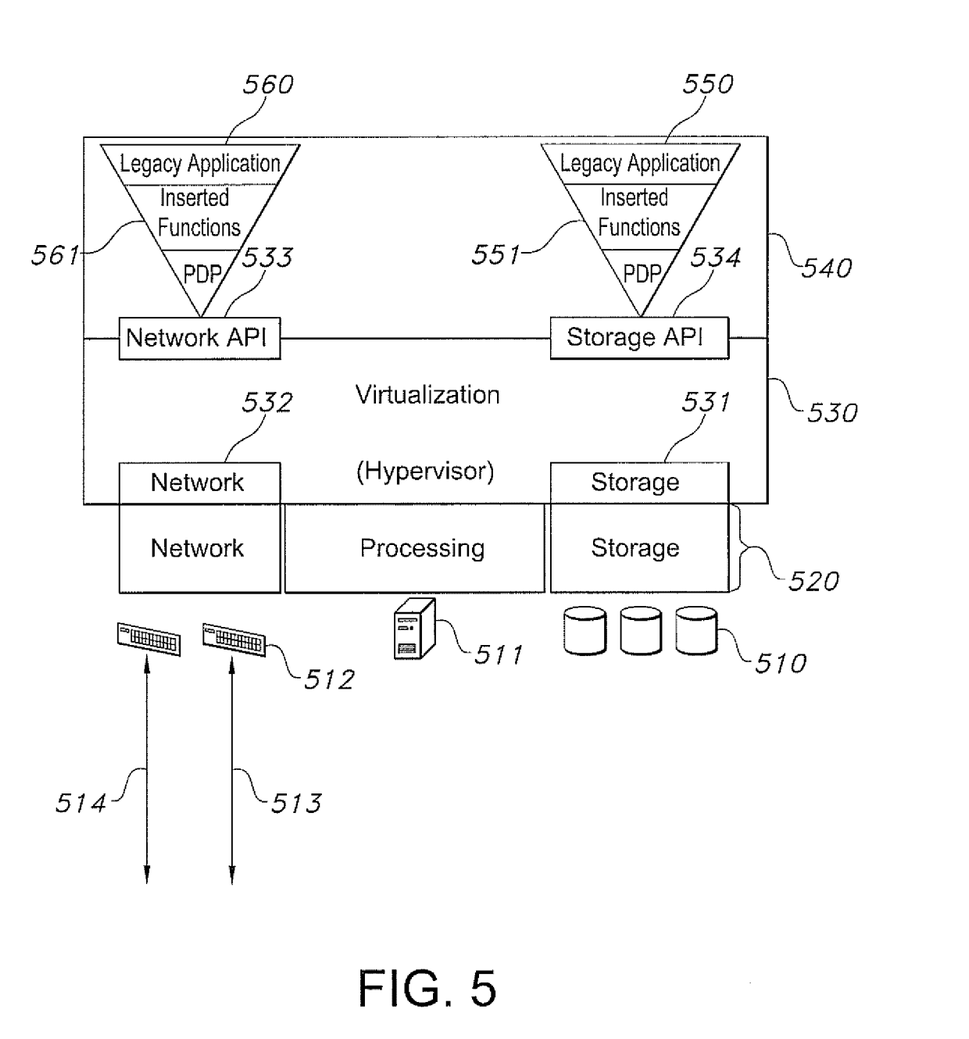

In another embodiment with reference to FIG. 5, the Inserted Functions 551, 561 of legacy applications 550 and 560 access APIs to the post Virtualization or Hypervisor functionality of the virtualization environment at 530. As a result, enhanced network APIs and storage APIs are provided so that the inserted functions are able to perform more and varied functionality specific to the hosting environment at 530. Such an embodiment provides better access to network 532 and storage 531 options because the semantics of the access can be more closely communicated. (Note that this embodiment may also be provided by the mechanism described in other embodiments, e.g., at VM 470.)

Figure 6:
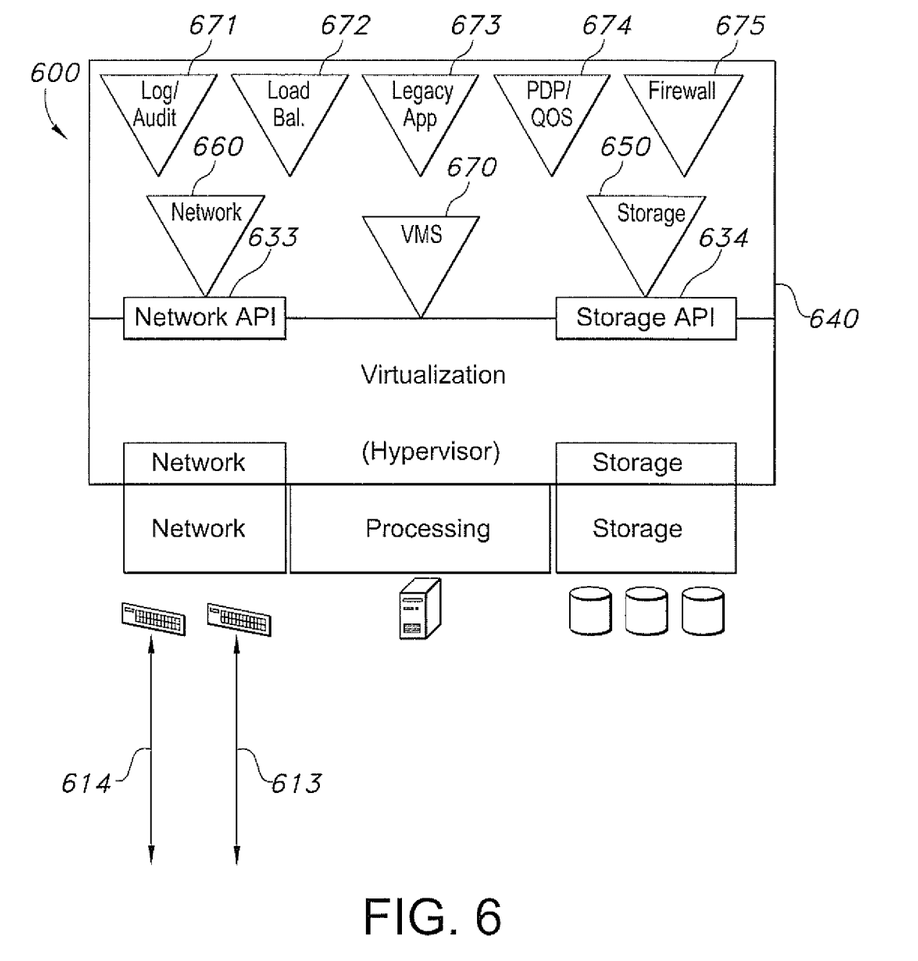

In another embodiment with reference to FIG. 6, the legacy application 673 is not modified at all by extraneous code, such as Inserted Functions and/or PDPs. Rather, it achieves this functionality by way of externalized virtual machines when it is bound to the operating environment of all the services typically offered by a guest operating system. In such a design, the legacy application requires no modification and represents but a comprehensive building of services in a virtualized environment.

When the legacy application is produced as a virtual machine 673, other virtual machine components are added to guest environment 640 to provide an appropriate environment for the legacy application 673. In a representative example, these other virtual machines include but are not limited to a virtual machine sequencer (VMS) 670, logging and auditing functions 671, load balancing 672, PDP (policy decision point) 674 and QOS (quality of service), and a firewall 675.

In more detail, the foregoing are envisioned as follows:

670, the Virtual Machine Sequencer provides the startup logic for all of the various virtual machines which are being instantiated to provide operating environment entry points expected by the legacy application and which provides the enhanced functionality for the legacy application. For example, 670 provides the computing logic that ensures that the appropriate supporting virtual machines are started in the order necessary, to become fully operational, and honor other dependencies between VMs.

In general, the sequencer needs to start other environments in a specific order and not allow dependent environments to start until those they are dependent upon have started and are ready to accept process or communication traffic. It is well to note that in many cloud environments, virtualized environments cannot be guaranteed to be on a same subnet and therefore discovery is impossible. What this means is that the sequencer must pass to the environment the IP address of the sequencer or some other coordinating environment. Part of the information passed back to the sequencer would be the IP address of the newly started virtualized environment so that IP address may be passed onto dependent virtualized environments. (For a further discussion on this topic, U.S. Published Patent Application No. 2010/0235539, entitled System and Method for Reduced Cloud IP Address Utilization, published on Sep. 16, 2010, is fully incorporated herein by reference).

Representatively, assume S is a service that depends upon other services (s1, s2, s3, . . . ). To access these other services, S needs the IP address of the services it depends upon. Rather than embedding the IP addresses as part of the configuration, the sequencer could both provide a name resolution 10 service as well as the sequencing service. During use, when S asks for the IP address of service s3, the sequencer will not return the IP address of s3 until s3 is launched and verified to be executing. Each of the infrastructural services—s1, s2, s3, . . . when launched, will explicitly register themselves with the Sequencer.

The VMS can be also used to start the legacy application 673, if necessary. In this way, the VMS 670 provides the bootstrap sequencing mechanism to make sure that the entire supporting environment plus legacy application are started in the appropriate manner recognizing dependencies and other start up issues. It is well to note that VMS 670 may also start up or at least verify proper functioning of the storage service 650 and the network service 660. In that these services 650, 660 may be a part of a larger, standard deployment, they may be already started. In still other functionality, the VMS 670 can be configured to monitor the operational readiness of the other virtual machines in the environment 640, including the legacy application, and restart them as necessary—required by policy (which policy was bound in the time that the virtual machines were added to the image at the time the legacy application was virtualized. By incorporation by reference, additional features of this design are more fully described in U.S. Published Patent Appl. No. 2008/0256535, published on Oct. 16, 2008, and entitled "Tesselated Virtual Machines for Common Computing Goals."). Of course, each of these virtual machines can be running in virtualized environments which exist on a same (as shown) or different hardware platform.

671, Log/Audit, provides for logging and auditing functions of the legacy environment so that the logging and auditing functions expected by those utilizing the legacy application are provided.

672, Load Balancing, provides the functions and services necessary to replicate any of the virtual machines as part of the operating environment or the legacy application as more services are added/decreased. As expected, this makes the load greater/smaller and the capacity of the collective summation of virtual machines is able to process the workload and/or content as necessary. Novell's PlateSpin and other products assist in this regard.

674. PDP/QOS, provides the policy decision point and quality of service mechanisms needed by the legacy application and/or all of the other virtual machines in the operational environment, e.g., 640, such that externalized entry points are influenced in their request by policies bound into 674. Thus, a request that is made via an externalized entry point can be modified by 674 to comply with predetermined computing policy and/or a quality of service metric. A quality of service modification may also include tagging or processing logic to ensure the proper functioning of storage and network services 650 and 660 so that the appropriate access to the network and storage mechanisms are allowed. This may include access to higher bandwidth networks and storage mechanisms.

675, Firewall, provides traditional security functionality that the legacy application environment expects or may rely on. This may be very useful in environments contemplating public clouds existing external to a traditional data center firewall.

673, legacy application, is the VM that has been bound to externalized entry points so that all operational mechanisms can be provided by the additional virtual machines as described above.

Naturally, other services or functionality can be provided which are not listed but would be known to those familiar with the art. These include, but are not limited to, identity and entitlement services. In such embodiments, each of the virtual machines comprising the new environment 600 would be identified by the identity or entitlement services. As such, each VMs "identity" would ensure that only authorized versions of virtual machines are instantiated and utilized. This could also include unique virtual machines running for all environments or specific instantiations for one or more specialized environments.

Figure 7:
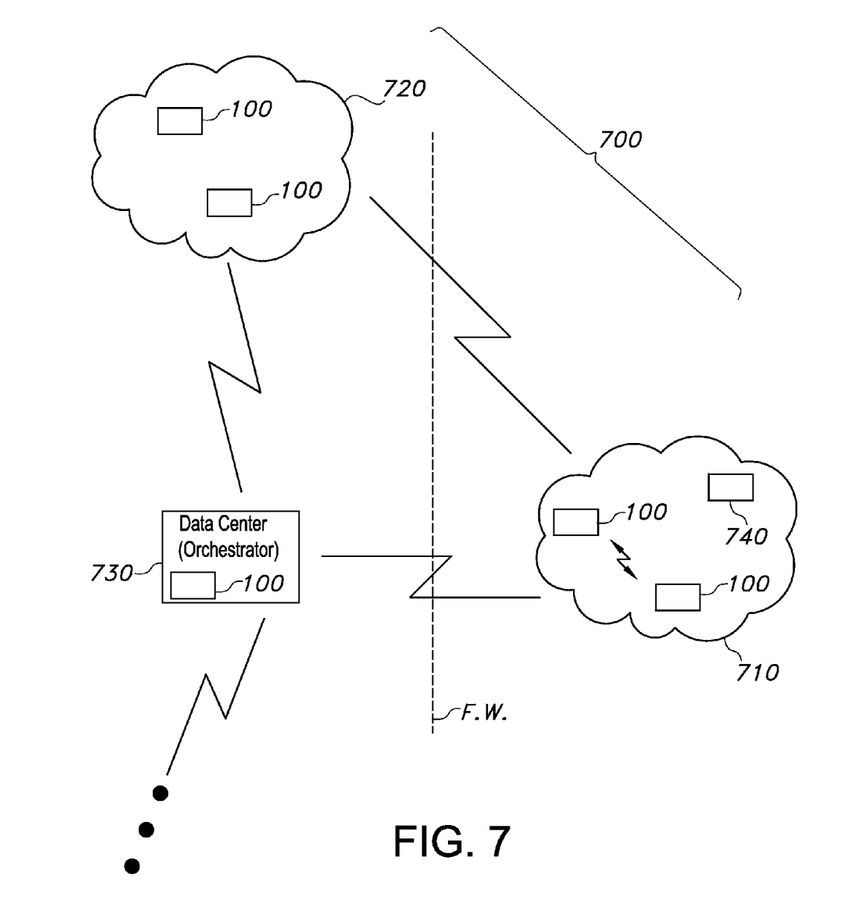
FIG. 7 is a diagrammatic view in accordance with the present invention for an embodiment contemplating cloud computing.

With reference to FIG. 7, the features of the invention can be replicated many times over in a larger computing environment 700, such as a "cloud" environment or a large enterprise context. In this regard, a public 710 and private cloud 720 could exist. The private cloud could exist behind a firewall (FW) for the benefit of an enterprise data center 730. Also, the virtual machines earlier described with legacy applications could reside in and out of the cloud and data center on a variety of traditional or virtual computing devices 100. They can also move between the many locations as needs are identified and fulfilled.

Also, a common orchestrator could reside with the data center, or elsewhere, to coordinate instantiating these VMs in the cloud context. Multiple such coordinators could also exist at each or a few locations for migration of workloads to individual computing devices 100. Also, the computing policies could be centrally managed and could further include scaling to account for competing interests between the individual data centers. Other policies could also exist that harmonize the events of the data centers. Alternatively still, nested hierarchies of all embodiments are even further contemplated.

Of course, a computing "cloud" typifies a computing style in which dynamically scalable and often virtualized resources are provided as a service over the Internet, intranet, etc. The term itself is a metaphor and permits treating computing resources as utilities automatically provisioned on demand while the cost of service is strictly based on actual resource consumption. Consumers of the resource also leverage technologies from the cloud that might not otherwise be available to them, in house, absent the cloud environment.

In any of the foregoing embodiments, skilled artisans should appreciate that to truly keep the legacy application unmodified, it is given an environment that is identical-as-practical (or -possible) to what the legacy application expects, as originally configured. In the situation of the cloud environment, this can include providing additional virtual machines where the run-time (access to storage, etc.) may be very different based on its location. Rather than injecting code into a legacy service VM under question, a further VM can be added into an appliance bundle. In turn, these additional "infrastructural" virtual machines could provide needed access to storage, network resources, firewalls etc. They could also support other functionality, such as those VMs in FIG. 6, since all external interaction with the legacy service VM will interact through these infrastructural VMs.

Naturally, the use of infrastructural VMs would also require assistance, such as from a Sequencer 740 to ensure both the infrastructural VMs and the service VMs, are started in an appropriate fashion, e.g., to be sequenced correctly. It is anticipated that such a Sequencer would be packaged as a VM on a hardware platform that is launched before the other virtual machines. A Sequencer here would be similar to that described at element 670 for the VMS. To accomplish this build, or any other herein, it is anticipated that a service such as Novell's SUSE Studio product, would be useful.

In still another embodiment, the host virtualization or hypervisor mechanism has facilities to distribute work request to other VM's. In this situation, it is contemplated that the legacy application need not be bound to specialized external entry points since the externalization of the service request entry points in the legacy application operating environment are already externalized by the host virtualization or hypervisor mechanisms. These can then be forwarded directly to the virtual machines previously described.

In still other embodiments, skilled artisans will appreciate that enterprises can implement some or all of the foregoing with the assistance of system administrators in enterprises or users in home/small office environments acting on computing devices by way of executable code. In turn, methods and apparatus of the invention further contemplate computer executable instructions, e.g., code or software, as part of computer program products on readable media, e.g., disks for insertion in a drive of computing device, or available as downloads or direct use from an upstream computing device. When described in the context of such computer program products, it is denoted that items thereof, such as modules, routines, programs, objects, components, data structures, etc., perform particular tasks or implement particular abstract data types within various structures of the computing system which cause a certain function or group of function, and such are well known in the art.

The foregoing has been described in terms of specific embodiments, but one of ordinary skill in the art will recognize that additional embodiments are possible without departing from its teachings. This detailed description, therefore, and particularly the specific details of the exemplary embodiments disclosed, is given primarily for clarity of understanding, and no unnecessary limitations are to be implied. Modifications will become evident to those skilled in the art upon reading this disclosure and may be made without departing from the spirit or scope of the invention. Relatively apparent modifications, of course, include combining the various features of one or more figures with the features of one or more of the other figures.

The invention claimed is:

1. In a computing system environment, a method of extending functionality of legacy services having original executable instructions for execution on a computing device, the method comprising:

converting the legacy services having original executable instructions to a virtual machine;

configuring the virtual machine to operate as an independent guest computing device on a hardware platform by way of scheduling control from a virtualization layer also on the hardware platform; and provisioning the virtual machine with a plurality of functions of executable instructions that are executed on a processor of the hardware platform to modify standard entry points of system functions of the hardware platform of the original executable instructions of the legacy services and allow the legacy services to access the plurality of functions of the virtual machine to access the system functions of the hardware platform by the legacy services, without otherwise modifying the original executable instructions of the legacy services;

wherein provisioning the virtual machine further includes provisioning the virtual machine with a policy decision point of executable instructions that are executed on the processor of the hardware platform to monitor the plurality of functions of the virtual machine that modify the standard entry points of the legacy services to ensure compliance with a predetermined computing policy for one or more of the system functions.

2. The method of claim 1, further including configuring a second virtual machine to operate as a second independent guest computing device on the hardware platform by way of scheduling control from the virtualization layer; and provisioning the second virtual machine with a policy decision point of executable instructions operable on the processor of the hardware platform to monitor the plurality of functions in the virtual machine to ensure compliance with a predetermined computing policy for one or more of the system functions.

3. The method of claim 1, further including provisioning the virtualization layer with a policy decision point of executable instructions operable on the processor of the hardware platform to monitor the plurality of functions in the virtual machine to ensure compliance with a predetermined computing policy for one or more of the system functions.

4. The method of claim 1, further including provisioning the virtualization layer with a second policy decision point of executable instructions operable on the processor of the hardware platform to cooperate with the policy decision point of executable instructions of the virtual machine to ensure said compliance of the predetermined computing policy.

5. The method of claim 1, further including converting the legacy services into a second virtual machine to operate as a second independent guest computing device on the hardware platform by way of scheduling control from the virtualization layer.

6. The method of claim 1, wherein the provisioning the virtual machine with said plurality of functions of executable instructions further includes making available to the legacy services pluralities of computing options for network access, storage, and processor functions.

7. The method of claim 6, wherein the making available pluralities of computing options further includes making available different bandwidth sizes for the network access, speeds or numbers of processors for the processor functions, or size or locations for the storage.

8. The method of claim 1, further including making available to a cloud computing environment the provisioned virtual machine.

9. In a computing system environment, a method of extending functionality of legacy services having original executable instructions for execution on a computing device, the method comprising:
 converting the legacy services having the original executable instructions to a virtual machine;
 configuring the virtual machine to operate as a guest computing device on a hardware platform by way of scheduling control from a virtualization layer;
 provisioning the virtual machine with a plurality of functions of executable instructions that are executed on a processor of the hardware platform to modify standard entry points of system functions of the hardware platform of the original executable instructions of the legacy services and allow the legacy services to access the plurality of functions of the virtual machine to access the system functions of the hardware platform by the legacy services, without otherwise modifying the original executable instructions of the legacy services;
 configuring a second virtual machine to operate as a second guest computing device on a second hardware platform by way of scheduling control from a second virtualization layer;
 configuring the virtual machine and second virtual machine to communicate with one another for accessing of system functions on one or both of the hardware platforms by said virtual machine; and
 provisioning the second virtual machine with a policy decision point of executable instructions that are executed on a second processor of the second hardware platform to monitor the plurality of functions of the virtual machine that modify the standard entry points of the legacy services to ensure compliance with a predetermined computing policy for one or more of the system functions.

10. The method of claim 9, wherein the configuring to communicate further includes providing a high-speed communication fabric bandwidth.

11. In a computing system environment, a method of extending functionality of legacy services including legacy applications of original executable instructions configured for execution on a computing device, the method comprising:
 converting at least one legacy application of the original executable instructions into a virtual machine to operate as a guest computing device on a hardware platform by way of scheduling control from a virtualization layer; and
 provisioning the virtual machine with a plurality of functions of executable instructions that are executed on a processor of the hardware platform to modify standard entry points of system functions of the hardware platform of the original executable instructions of the at least one legacy application and allow the at least one legacy application to access the plurality of functions of the virtual machine to access the system functions of the hardware platform by the at least one legacy application, without otherwise modifying the original executable instructions of the legacy services;
 wherein provisioning the virtual machine further includes provisioning the virtual machine with a policy decision point of executable instructions that are executed on the processor of the hardware platform to monitor the plurality of functions of the virtual machine that modify the standard entry points of the at least one legacy application to ensure compliance with a predetermined computing policy for one or more of the system functions.

12. In a computing system environment, a method of extending functionality of legacy services including legacy applications of original executable instructions configured for execution on a computing device, the method comprising:
 converting at least one legacy application of the original executable instructions into a virtual machine to operate as a guest computing device on a hardware platform by way of scheduling control from a virtualization layer;
 configuring a second virtual machine to operate as a second guest computing device on a same or a different said hardware platform by way of scheduling control from a same or different said virtualization layer; and
 provisioning the second virtual machine with a plurality of functions of executable instructions that are executed on a processor of the same or different said hardware platform to modify standard entry points of system functions of the same or the different said hardware platform of the original executable instructions of the at least one legacy application and allow the at least one legacy application to access the plurality of functions of the second virtual machine to access the functions of the hardware platform by the at least one legacy application converted into the virtual machine, without otherwise modifying the original executable instructions of the at least one legacy application;
 wherein provisioning the second virtual machine further includes provisioning the second virtual machine with a policy decision point of executable instructions that are executed on the processor of the same or different said hardware platform to monitor the plurality of functions of the second virtual machine that modify the standard entry points of the at least one legacy application to ensure compliance with a predetermined computing policy for one or more of the system functions.

13. In a computing system environment, a method of extending functionality of legacy services having original executable instructions for execution on a computing device, the method comprising:
 converting the legacy service having the original executable instructions to a virtual machine;
 configuring a virtual machine to operate as a guest computing device on a hardware platform by way of scheduling control from a virtualization layer; and
 provisioning the virtual machine with a plurality of functions of executable instructions that are executed on a processor of the hardware platform to modify the standard entry points of the hardware platform of the original executable instructions of the legacy service and allow the legacy service to access application program interfaces (APIs) of the virtualization layer to provide network or storage access options for the legacy services originally unavailable to the legacy services on said computing device, without otherwise modifying the original executable instructions of the legacy services;
 wherein provisioning the virtual machine further includes provisioning the virtual machine with a policy decision point of executable instructions that are executed on the processor of the hardware platform to monitor the plurality of functions of the virtual machine that modify the standard entry points of the legacy service to ensure compliance with a predetermined computing policy.

14. The method of claim 13, further including configuring a second virtual machine to operate as a second guest computing device on a same or different said hardware platform by way of scheduling control from a same or different said virtualization layer; and configuring the virtual machine and second virtual machine to communicate with one another for utilizing said network or storage access options available to either of the hardware platforms.

15. The method of claim 13, further including configuring multiple virtual machines to operate as multiple guest computing devices on a same or different said hardware platform by way of scheduling control from a same or different said virtualization layer, wherein the configured multiple virtual machines provide infrastructure services to the legacy services originally unavailable to the legacy services on said computing device or originally available to the legacy services but in a different location.

16. The method of claim 15, further including providing the configured multiple virtual machines as at least one of an event logging service, an event audit service, a quality-of-service metric service, a load-balancing service, a virtual machine sequencing service, or a firewall service.

17. The method of claim 16, further including configuring the virtual machine sequencing service to provide ordered startup logic for each said multiple virtual machine.

18. The method of claim 16, further including configuring the load balancing service to assess a collective summation of services provided to the legacy services by each said multiple virtual machine.

19. The method of claim 15, further including configuring any of said multiple virtual machines as a software appliance.

20. The method of claim 15, further including making available any of said multiple virtual machines to a cloud computing environment remote or local to the legacy services.

21. The method of claim 13, further including converting the legacy services into a second virtual machine to operate as a second independent guest computing device on the hardware platform by way of scheduling control from the virtualization layer.

22. A computing device for extending functionality of legacy services having original executable instructions for execution on a computing device, the computing device comprising:

a hardware platform, including a processor and memory;
a virtualization layer on the hardware platform; and
a plurality of virtual machines each operating as a guest computing device on the processor and memory by way of scheduling control from the virtualization layer, wherein the legacy services having the original executable instructions are converted to at least one virtual machine that includes a plurality of functions of executable instructions that are executed on the processor to modify standard entry points of system functions of the hardware platform of the original executable instructions of the legacy services and allow the legacy services to access the plurality of functions of the at least one virtual machine to access the system functions of the hardware platform by the legacy services, without otherwise modifying the original executable instructions of the legacy services;

wherein one of the virtual machines includes a policy decision point of executable instructions that are executed on the processor of the hardware platform to monitor the plurality of functions of the at least one virtual machine that modify the standard entry points of the legacy services to ensure compliance with a predetermined computing policy for one or more of the system functions.

23. The computing device of claim 22, wherein the system functions include network access to other hardware platforms, computing storage or other processors.

24. The computing device of claim 22, wherein one of the virtual machines further includes a legacy application of the legacy services converted into said one of the virtual machines.

25. A computing system for extending functionality of legacy services having original executable instructions for execution on a computing device, the computing device comprising:

first and second hardware platforms each with first and second processors and memory;
first and second virtualization layers on the first and second hardware platforms, respectively; and
a plurality of virtual machines each operating as an independent guest computing device on the first and second processors and memory by way of scheduling control from the first and second virtualization layers, wherein the legacy services having the original executable instructions are converted to at least one virtual machine that includes a plurality of functions of executable instructions that are executed on the processor to modify standard entry points of system functions of one or both of the first and second hardware platforms of the original executable instructions of the legacy services and allow the legacy services to access the plurality of functions of the at least one virtual machine to access the system functions of one or both of the first and second hardware platforms by the legacy services, without otherwise modifying the original executable instructions of the legacy services; and wherein the at least one virtual machine includes a policy decision point of executable instructions that are executed on the processor of one or both of the first and second hardware platforms to monitor the plurality of functions of the at least one virtual machine that modify the standard entry points of the legacy services to ensure compliance with a predetermined computing policy for one or more of the system functions.

26. The computing system of claim 25, further including a communication fabric bandwidth between network ports of each of the first and second hardware platforms so the plurality of virtual machines of the first and second hardware platforms can communicate with one another.

27. A computing device for extending functionality of legacy services having legacy applications of original executable instructions configured for execution on a computing device, the computing device comprising:

a hardware platform, including a processor and memory;
a virtualization layer on the hardware platform;
a first virtual machine converted from one of the legacy applications, the first virtual machine operating as a first independent guest computing device on the processor and memory by way of scheduling control from the virtualization layer; and
a second virtual machine operating as a second independent guest computing device on the processor and memory by way of scheduling control from the virtualization layer, the second virtual machine being provisioned with system access options of the hardware platform originally unavailable to the legacy services on said computing device by modifying standard entry points of system functions of the hardware platform of the original executable instructions of the one of the legacy applications and provide access to said system access option to the first virtual machine converted from the one of the legacy applications to access the system functions of the hardware platform by the one of the legacy applications without otherwise modifying the original executable instructions of the one of the legacy applications;

wherein one of the first and second virtual machines further includes a policy decision point of executable instructions installed for operation on the processor to monitor the system access options of the second virtual machine that modify the standard entry points of the one of the legacy applications to ensure compliance of a predetermined computing policy for said system access options.

28. The computing device of claim 27, wherein the virtualization layer
further includes a second policy decision point of executable instructions installed for operation on the processor to cooperate with said policy decision point of the first or second virtual machines.

29. The computing device of claim 27, wherein the hardware platform is installed in a computing cloud.

30. A computing device for extending functionality of legacy services having original executable instructions for execution on a computing device, the computing device comprising:
a hardware platform, including a processor and memory;
a virtualization layer on the hardware platform;
a plurality of virtual machines each operating as an independent guest computing device on the processor and memory by way of scheduling control from the virtualization layer, wherein each of the virtual machines is configured to provide infrastructure services to at least one legacy application of the legacy services configured as a virtual machine, the infrastructure services being originally unavailable to the legacy services when installed on said computing device, wherein the virtual machine is configured with a plurality of functions of executable instructions to modify standard entry points of system functions of the hardware platform of the original executable instructions of the at least one legacy application and allow the at least one legacy application to access the plurality of functions of the virtual machine to access the system functions of the hardware platform by the at least one legacy application, without otherwise modifying the original executable instructions of the legacy services; and
wherein the virtual machine is provisioned with a policy decision point of executable instructions that are executed on the processor of the hardware platform to monitor the plurality of functions of the virtual machine that modify the standard entry points of the at least one legacy application to ensure compliance with a predetermined computing policy for one or more of the system functions.

31. The computing device of claim 30, wherein one of the virtual machines is configured to provide to the legacy application at least one of an event logging service, an event audit service, a quality-of-service metric service, a load-balancing service, a virtual machine sequencing service, or a firewall service.

32. The computing device of claim 31, wherein the one of the virtual machines configured to provide the virtual machine sequencing service further includes executable instructions to provide ordered startup logic for each said multiple virtual machine.

33. The computing device of claim 31, wherein the one of the virtual machines configured to provide the load balancing service further includes executable instructions to assess a collective summation of services provided to the legacy application by each said multiple virtual machine.

34. A computer program product embodied in a non-transitory computer readable medium for loading on a computing device in a computing system environment for extending functionality of legacy services having original executable instructions designed for installation on an original computing device, the computer program product comprising:
executable instructions for provisioning a virtual machine to operate as a guest computing device on a processor and memory of a hardware platform by way of scheduling control from a virtualization layer to provide access to a legacy application of the legacy services on a same or a different said hardware platform system functions of at least network access, processor functions or storage options originally unavailable to the legacy services on said original computing device or originally available to the legacy services but in a different location;
said legacy application being configured as the a virtual machine and said executable instructions including at least instructions that are executed on the a processor of the same or different said hardware platform to modify standard entry points of the same or the different said hardware platform system functions of the original executable instructions of the legacy application and allow the legacy application to access the at least instructions of the virtual machine to access system functions of the same or the different said hardware platform by the legacy application configured as a the virtual machine without otherwise modifying the original executable instructions of the legacy application; and
wherein provisioning the virtual machine further includes provisioning the virtual machine with a policy decision point of executable instructions that are executed on the processor to monitor the at least instructions of the virtual machine that modify the standard entry points of the legacy application to ensure compliance with a predetermined computing policy for one or more of the system functions.

* * * * *

UNITED STATES PATENT AND TRADEMARK OFFICE
CERTIFICATE OF CORRECTION

PATENT NO.       : 8,756,597 B2                                  Page 1 of 1
APPLICATION NO.  : 12/700989
DATED            : June 17, 2014
INVENTOR(S)      : Srinivasan et al.

It is certified that error appears in the above-identified patent and that said Letters Patent is hereby corrected as shown below:

Title Page, (75) Inventors: please replace "Kaltiganehalli" with -- Kattiganehalli --.

In the Claims

Claim 34, Column 16, line 35, please delete "a" before virtual.

Claim 34, Column 16, line 37, please delete "a" before processor.

Claim 34, Column 16, line 45, please delete "a" before the.

Signed and Sealed this
Sixteenth Day of December, 2014

Michelle K. Lee
*Deputy Director of the United States Patent and Trademark Office*